United States Patent [19]

Konishi

[11] 4,392,639
[45] Jul. 12, 1983

[54] DAMPER SUPPORT FOR ENGINE MOUNTS

[75] Inventor: Keizo Konishi, Inuyama, Japan

[73] Assignee: Tokai Rubber Industries Ltd., Komaki, Japan

[21] Appl. No.: 250,902

[22] Filed: Apr. 3, 1981

[30] Foreign Application Priority Data

Apr. 11, 1980 [JP] Japan ............................. 55-47553

[51] Int. Cl.³ ............................................. F16F 9/04
[52] U.S. Cl. ................................. 267/140.1; 248/562
[58] Field of Search ............... 248/562; 267/8 R, 35, 267/64.17, 140.1, 141.1

[56] References Cited

U.S. PATENT DOCUMENTS 2,507,227  5/1950  Skinner ............................ 267/140.1
2,610,016  9/1952  Crede ............................... 267/140.1

FOREIGN PATENT DOCUMENTS 2906282  8/1980  Fed. Rep. of Germany ...... 248/562
1047112  7/1953  France ............................. 248/562
 457730 12/1936  United Kingdom ................ 267/35

Primary Examiner—Duane A. Reger
Attorney, Agent, or Firm—Hedman, Casella, Gibson, Costigan & Hoare

[57] ABSTRACT

At least one confined chamber is formed by one and the other mounting fixtures and by a wall of rubber elastomer hermetically connecting the two fixtures, and a pump chamber made operative to effect a pumping action in response to the vibrations of the one mounting fixture is formed separately of the aforementioned confined chamber so that the atmosphere is pumped into the confined chamber from that pump chamber.

In the damper support thus constructed, since the air is pumped into the inside when in the vibrations of low frequency, the damping factor can be made large. Even in the vibrations of high frequency, the dynamic spring constant can be made small.

10 Claims, 2 Drawing Figures

4,392,639

DAMPER SUPPORT FOR ENGINE MOUNTS

BACKGROUND OF THE INVENTION

1. Field of the Invention

The present invention relates to a damper support, and more particularly to a damper support to be used as an engine mount.

2. Description of the Prior Art

Generally speaking, a damper support is so constructed that a rubber elastomer is interposed between one mounting fixture and the other mounting fixture. This well known damper support has a small damping factor because the loss factor of rubber is low, but is required as an engine mount to have a high damping factor in the vibrations of low frequency range (in the vicinity of 15 Hz) and to have a small dynamic spring constant in the vibrations of high frequency range (in the vicinity of 100 Hz).

In order to meet those requirements, two damper supports making use of the elasticity of rubber and the flow resistance of a fluid has been proposed by Japanese Patent Publications No. 48-36151 published on Nov. 1, 1973 and No. 52-16554 published on May 10, 1977. However, since a liquid is confined in the damper supports proposed, there are problems both in the leakage of the liquid from the adhered portions between the rubber and the fixtures and from the pin holes in the rubber and in the fatigue of the rubber due to the liquid. Moreover, it is difficult to maintain the pressure of the gas confined at a constant level for a long time. In order to maintain the gas pressure constant, it is sufficient to pump a gas at all times, as in an pneumatic spring, by the use of a compressor. The piping and wiring of the compressor are required to make the system complex and expensive thereby to raise a problem in practice.

As a damper support of the aforementioned type, moreover, there has also be proposed a U.S. Pat. No. 4,159,091 to Le Salver et al. The damper support disclosed in that U.S. Patent is so constructed that a partition wall partitioning a main confined chamber and an auxiliary confined chamber is made movable. As a result, the dynamic spring constant in a high frequency range (at 100 Hz) becomes far smaller than that of the construction, in which the partition wall is stationary, so that the U.S. Patent is more perferable than the aforementioned two Japanese Patent Publications in respect of the synamic spring constant characteristics in the high frequency range. However, not only in the vibrations of a low frequency range (in the vicinity of 15 Hz) and of a small amplitude (±0.5 mm) but also in the vibrations in a high frequency range and of a small amplitude (±0.05 mm), the flow of the fluid passing through a round orifice, which is formed in the partition wall, becomes turbulent even under the condition in which the flow speed through that orifice is considerably decreased. As a result, the damping factor is increased even in the high frequency range similarly to the low frequency range thereby to raise a problem that the damping characteristics in the high range are not satisfactory.

SUMMARY OF THE INVENTION

It is, therefore, an object of the present invention to provide a damper support for engine mounts, in which the problems concomitant with the aforementioned Japanese Patent Publications and U.S. Patent are effectively solved.

Another object of the present invention is to provide a damper support for engine mounts, in which, even when the inside thereof has its pressure lowered to an atmospheric level as a result of a natural leakage, the vibrations applied thereto are utilized to automatically pump the air thereinto when in the vibrations of a low frequency and of a large amplitude so that the damping factor in the low frequency range is enlarged.

According to a feature of the present invention, there is provided a damper support which comprises: at least one confined chamber and a pump chamber defined by one and the other mounting fixtures and by an elastic member hermetically connecting said two mounting fixtures, said pump chamber being operative to effect a pumping action in response to the vibrations of at least one of said mounting fixtures; means for providing communications between said pump chamber and the atmosphere and between said pump chamber and said confined chamber, respectively; and valve means mounted in said communication means, respectively.

Further objects, advantages and features of the present invention will become more fully apparent from a detailed consideration of the arrangement and construction of the constituent parts as set forth in the following specification taken together with the accompanying drawings.

DESCRIPTION OF THE PREFERRED EMBODIMENTS

Figure 1:
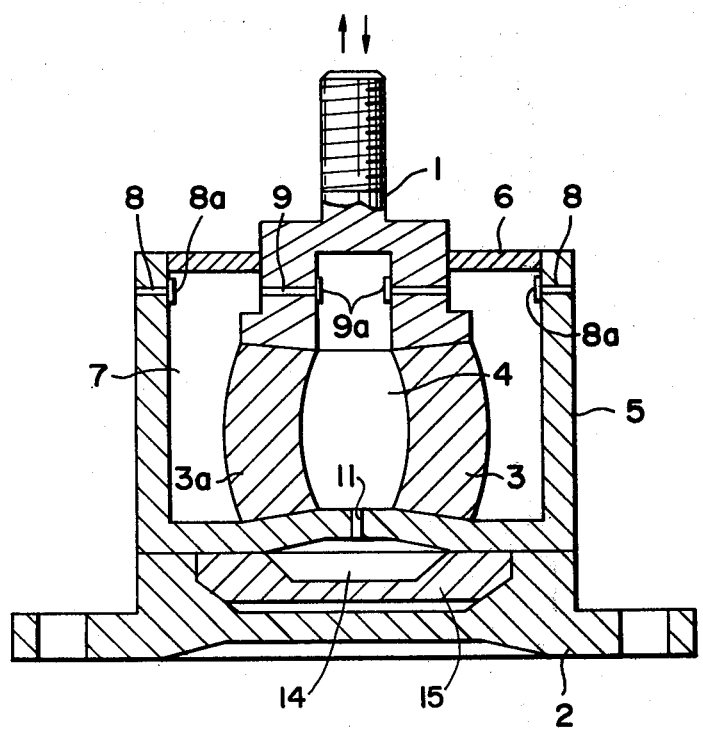
FIG. 1 is a longitudinal section showing one embodiment of a damper support according to the present invention.

FIG. 1 shows one embodiment of a damper support according to the present invention. One mounting fixture 1 and the other mounting fixture 2 are hermetically connected by means of the wall 3a of a cylindrical elastic member 3 made of rubber, for example, thereby to form a confined chamber 4 in wall 3a. An orifice 11 extends from the confined chamber 4 to a second confined chamber 14 which is partially defined by diaphragm 15. A cylindrical wall 5 is made to extend in a manner to surround the other mounting fixture 2, the wall 3a and a portion of the one mounting fixture 1. The upper end of the cylindrical wall 5 thus made and the one mounting fixture 1 are closed by means of a partition 6 which is made of either elastic rubber or flexible metal such as a stainless steel or brass plate thereby to form a pump chamber 7 which is defined by the wall 3a, the other mounting fixture 2, the cylindrical wall 5 and the partition 6. In order to impart a pumping function to the pump chamber 7, the cylindrical wall 5 is formed with a through passage 8 through which the atmosphere is sucked and in which an inlet valve 8a constructed of a check valve is mounted, whereas the wall 3a is formed with a through passage 9 for providing communication between the confined chamber 4 and the pump chamber 7, and an outlet valve 9a constructed of a check valve is mounted on the inner wall of the confined chamber 4.

The damper support is attached such that the one mounting fixture 1 is fixed to an engine side whereas the other mounting fixture 2 is fixed to the body side of a vehicle. If, under that condition, engine vibrations in a low frequency range are applied in case the inside of the damper support is at the atmospheric level, the amplitude is large (at ±0.5 mm). As a result, when the one mounting fixture 1 is pushed toward the other mounting fixture 2 (at a compression stroke), the wall 3a is bulged toward the pump chamber 7 thereby to reduce the capacity of the pump chamber 7, and at the same time the center portion of the partition 6 is moved together with the one mounting fixture 1 toward the other mounting fixture 2 thereby to further reduce the capacity of the pump chamber 7 so that the air therein is compressed. As a result, the air thus compressed is pumped into the confined chamber 4 from the outlet valve 9.

On the contrary, if the one mounting fixture 1 is moved apart from the other mounting fixture 2 (at an extension stroke), the capacity of the pump chamber 7 is increased, as opposite to the aforementioned stroke, thereby to introduce the atmosphere into the pump chamber 7 through the inlet valve 8a. By repeating these two strokes, the air is pumped into the confined chamber 4 to raise the internal pressure so that the wall 3a forced to bulge.

Simultaneously with this, the internal pressure in the pump chamber 7 is raised until the inlet valve 8a of the pump chamber 7 becomes inoperative to interrupt the introduction of the air into the confined chamber 4. Thus, the damping effect of the air introduced under pressure into the confined chamber 4 is added so that the damping effect is made larger than that in case it comes only from the rubber elastic member. Changes in pressure in confined chamber 4 cause the movement of air through orifice 11 into or out of the second confined chamber 14, thereby causing movement of diaphragm 15. This further contributes to the damping effect.

In a high frequency range, on the contrary, since the amplitude is small (at ±0.05 mm) and the vibrations are effected at a high frequency, both the inlet valve 8a and the outlet valve 9a are vibrated to lose their valve functions so that the air in the pump chamber 7 and in the confined chamber 4 takes the atmospheric level thereby to reduce the dynamic spring constant, whereby the damper support can exhibit a suitable performance as the engine mount.

The damper support thus constructed can damp, as seen from the drawing, not only the vertical vibrations (in the direction toward and apart from the one mounting fixture 1 and the other mounting fixture 2) between the two mounting fixtures 1 and 2 but also the horizontal and torsional vibrations there between. As indicated at broken lines in FIG. 1, on the other hand, the valves 8a and 9a and the passage 9 are provided, while eliminating the passage 8, so that the wall 3a may be inwardly contracted to introduce the atmosphere into the confined chamber 4, whereby the air can be pumped into the pump chamber 7.

Figure 2:
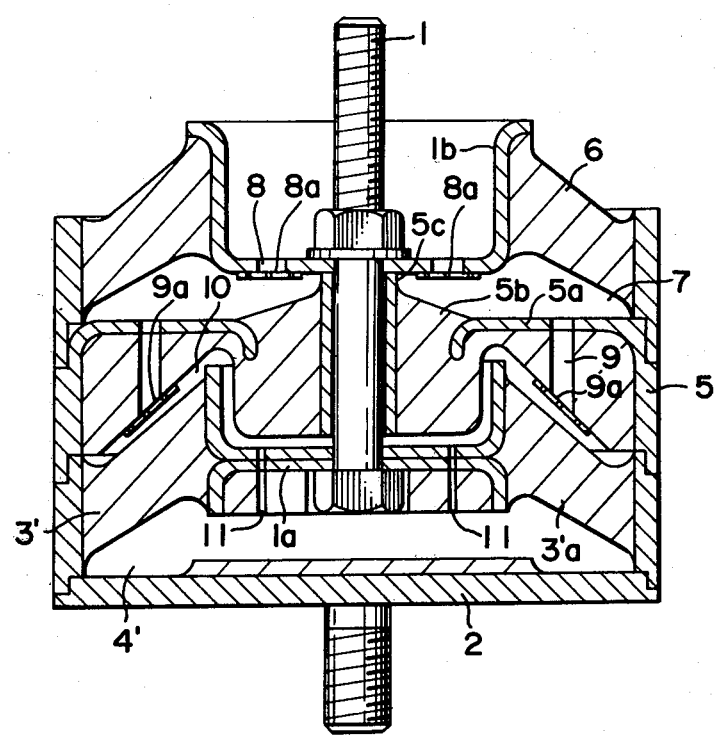
FIG. 2 is a longitudinal section showing another embodiment.

FIG. 2 shows another embodiment of the damper support according to the present invention. As shown, the cylindrical metal wall 5 is made to extend from the circumferential edge of the other mounting fixture 2. The wall 3'a of an elastic member 3' of rubber is made to extend in a frusto-conical shape from the portion of the cylindrical wall 5 closest to the mounting fixture 2 thereby to form a first confined chamber 4' between itself and the mounting fixture 2. A metal wall 5a is formed in a disc shape to the vicinity of the cylindrical wall 5 while leaving a gap from the wall 3'a of the elastic rubber member, and a connecting portion 5b made of elastic rubber is made to connect the metal wall 5a and a metal cylinder 5c which is arranged at the center thereby to form a second confined chamber between the connecting portion 5b and the wall 3'a. This wall 3'a is formed with orifices for providing communication between the first and second confined chambers 4' and 10. The one mounting fixture 1 is formed into a shape of a bolt, which has its one end hermetically connected to the wall 3'a by means of a cap member 1a of metal and its other end extending through the metal cylinder 5c to the outside of the cylindrical wall 5. The end of this metal cylinder 5 at the opposite side to the wall 3'a is integrally formed with an inverted hat member 1b which is formed with the passage 8 and which is hermetically fixed to the one mounting fixture 1. Between the outer circumference of the inverted hat member 1b and the inner wall of the upper end of the cylindrical wall 5, there is hermetically mounted the partition 6 of elastic rubber in a conical shape thereby to form the pump chamber 7 between the partition 6 and the wall 5a. The inlet valve 8a is mounted in the bottom portion of the passage 8 of the inverted hat member 1b, and the outlet valve 9a is mounted in the passage 9, which extends through the wall 5a for providing communication between the pump chamber 7 and the second confined chamber 10, at the side of the wall 3'a.

If vibrations in the low frequency range are applied in the axial direction of the bolt-shaped mounting fixture 1 to the damper support having the construction thus far described, the air is pumped from the pump chamber 7 into the second confined chamber 10 through the inlet valve 8a and the outlet valve 9a and further into the first confined chamber 4' through the orifices 11 which are formed in the wall 3'a. By confining the air under pressure in the first and second confined chamber 4' and 10, the vibrations are absorbed by the compressed air in addition to the rubber elasticities at the wall 3'a, the partition 6 and the connecting portion 5b. Moreover, the compressed air is alternately forced through the orifices 11 into the first and second confined chambers 4' and 10 so that the damping factor can be made larger than that of the damper support shown in FIG. 1 by the flow resistance to be established during the flowing stroke.

The damper support according to the second embodiment is the same as that shown in FIG. 1 in that the damping characteristics in the high frequency range are dependent exclusively upon the elastic rubber member.

The present invention will be described in the following in conjunction with the following Example:

EXAMPLE

An elastic member used had the following shape shown in FIG. 2 and was made of rubber of Hs-43 degrees, which was composed mainly of natural rubber. Specifically:

The internal diameter of the cylindrical wall (5)=50 mm;
The distance between the upper end of the inverted hat member (1b) and the mounting fixture (2)=86 mm;
The diameter of the passage (8)=5 mm;
The diameter of the passage (9)=5 mm;
The diameter of the orifices (11)=1 mm;
The internal diameter of the inverted hat member (1b) 50 mm;

The external diameter of the cap member (1a)=50 mm; and

The thickness of the partition (6) and the wall (3'a)=13 mm.

The data, which were obtained by the use of the damper support having the specifications described in the above, are tabulated in Table 1:

TABLE 1

| Static Spring Constant | $k_s = 26.3$ kg/mm |
| Dynamic Spring Constant in Vibrations of 10 Hz | $k_{d10} = 36.6$ kg/mm |
| Dynamic Spring Constant in Vibrations of 15 Hz | $k_{d15} = 37.5$ kg/mm |
| Dynamic Spring Constant in Vibrations of 100 Hz | $k_{d100} = 35.5$ kg/mm |
| Damping Factor in Vibrations of 10 Hz | $C_{10} = 0.150$ kg.sec/mm |
| Damping Factor in Vibrations of 15 Hz | $C_{15} = 0.096$ kg.sec/mm |
| Damping Factor in Vibrations of 100 Hz | $C_{100} = 0$ |

According to the present invention, incidentally, if the amplitude of the vibrations to be applied to the one mounting fixture is so small as to make it difficult to establish the pumping action of the pump chamber, the vibrations to be applied to the one mounting fixture may be enlarged to effect the pumping action.

While the present invention has been described with reference to particular embodiments thereof, it will be understood that numerous modifications may be made by those skilled in the art without actually departing from the spirit and scope of the invention as defined in the appended claims.

I claim:

1. A damper support comprising: at least one confined chamber and a pump chamber defined by two mounting fixtures and by an elastic member hermetically connecting said two mounting fixtures, said pump chamber being operative to effect a pumping action in response to the vibrations of at least one of said mounting fixtures; means for providing communications between said pump chamber and the atmosphere and between said pump chamber and said confined chamber, respectively; and check valve means mounted in said communication means, respectively.

2. A damper support according to claim 1, wherein said elastic member forms a common wall shared between said pump chamber and said confined chamber.

3. A damper support according to claim 1 or 2, further comprising a partition made of an elastic material and interposed between said two mounting fixtures for partitioning said pump chamber from the outside.

4. A damper support according to claim 1 or 2, wherein said elastic member is made of rubber.

5. A damper support according to claim 3, wherein said partition is made of rubber.

6. A damper support comprising: a first confined chamber defined by two mounting fixtures and an elastic member hermetically connecting said two mounting fixtures; a pump chamber formed adjacent to a second confined chamber through connecting means and made operative to effect a pumping action in response to the vibrations of at least one of said mounting fixtures; an orifice for providing communication between the first and second confined chambers; means for providing communications between the second confined chamber and said pump chamber and between said pump chamber and the atmosphere, respectively; and valve means mounted in said communication means.

7. A damper support according to claim 6, wherein said connecting means includes rigid plate means.

8. A damper support according to claim 6 or 7, further comprising a partition made of an elastic material for partitioning said pump chamber from the outside.

9. A damper support according to claim 3 wherein said partition is made of stainless steel.

10. A damper support according to claim 3 wherein said partition is made of brass.

* * * * *